United States Patent [19]

Fukazawa et al.

[11] Patent Number: 5,298,973
[45] Date of Patent: Mar. 29, 1994

[54] PHASE DIFFERENCE CONTROLLER AND METHOD FOR CONTROLLING PHASE DIFFERENCE

[75] Inventors: Tomoyuki Fukazawa, Hachioji; Mitsuru Sano, Sagamihara; Nobuyuki Sakayanagi, Tama, all of Japan

[73] Assignee: Jasco Corporation, Tokyo, Japan

[21] Appl. No.: 909,378

[22] Filed: Jul. 6, 1992

[30] Foreign Application Priority Data

Jul. 5, 1991 [JP] Japan .................. 3-190995

[51] Int. Cl.$^5$ .................. G01J 4/00; G02F 1/01
[52] U.S. Cl. .................. 356/368; 356/364; 356/365; 356/366; 356/367; 250/225
[58] Field of Search .............. 356/364, 365, 366, 367, 356/368; 250/225

[56] References Cited

U.S. PATENT DOCUMENTS

| | | | |
|---|---|---|---|
| 3,345,905 | 10/1967 | Alloque | 356/365 X |
| 3,622,794 | 11/1971 | Pond et al. | 250/225 X |
| 3,704,997 | 12/1972 | Smith | 359/276 |
| 4,176,951 | 12/1979 | Robert et al. | 356/365 X |
| 4,309,110 | 1/1982 | Tumerman | 356/366 X |
| 4,523,847 | 1/1985 | Bjorklund et al. | 335/364 X |
| 4,556,791 | 12/1985 | Spillmon, Jr. | 250/225 |
| 4,755,665 | 7/1988 | Ulmer, Jr. et al. | 250/225 X |
| 4,905,169 | 2/1990 | Buican et al. | 356/365 X |
| 5,036,204 | 7/1991 | Leyden | 356/364 X |
| 5,191,387 | 3/1993 | Ichikawa et al. | 356/364 X |

OTHER PUBLICATIONS

S. N. Jasperson et al., "An Improved Method for High Reflectivity Ellipsometry ... Technique"; The Review of Scientific Instruments; vol. No. 40, No. 6; Jun. 1969, pp. 761–767.

Primary Examiner—James C. Housel
Assistant Examiner—Milton I. Cano
Attorney, Agent, or Firm—Browdy and Neimark

[57] ABSTRACT

Phas difference controller for use in equipments having a photoelastic modulator, such as ellipsometers and optical rotatory dispersion meters. For enabling the photoelastic modulator to produce the constant amplitude of the phase difference regardless of the change in the wavelength of light incident into the photoelastic modulator, and regardless of the change in the temperature of the photoelastic modulator itself or its atmosphere, the controller has a birefringence polarizer which splits incident light into two linearly polarized light beams, ordinary light and extraordinary light. One of them acts as reference light LR and the other one acts as main light LM. These light beams pass through a photoelastic modulator which is forced to vibrate at angular frequency of $\omega$. After that, the passed reference light LR is detected by a photomultiplier via an analyzer. The photoelastic modulator is forced to vibrate at angular frequency of $\omega$ so that the ratio of the amplitude of the ac component of angular frequency of $2\omega$ to the dc component included in the output signal of the photomultiplier is maintained constant.

8 Claims, 6 Drawing Sheets

PHASE DIFFERENCE CONTROLLER AND METHOD FOR CONTROLLING PHASE DIFFERENCE

BACKGROUND OF THE INVENTION

1. Field of the Invention

The present invention relates to phase difference controllers and methods for controlling the phase difference for use in equipments with a photoelastic modulator, such as ellipsometers, optical rotatory dispersion meters (ORD), circular dichroism dispersion meters (CD), linear dichroism dispersion meters (LD), and linear birefringence dispersion meters (LB), etc.

2. Description of Prior Art

FIG. 6 shows a conventional ellipsometer.

Here, continuous spectrum light is radiated from a light source 10, and wavelength selection is carried out for that light by a spectrometer 12. Then, passing through a polarizer 14, the light is converted to linearly polarized light. Furthermore, while the light passes through a photoelastic modulator 16, the modulator produces the phase difference $\delta$ between the linearly polarized components whose electrical vectors vibrate in the directions perpendicular to each other. This phase difference $\delta$ varies as $\delta = \delta_0 \sin \omega t$ responding to the voltage $V_0 \sin \omega t$ applied to the photoelastic modulator 16 from the driving circuit 18. (In more strict expression, $\delta$ should be described by $\delta = \delta_0 \sin(\omega t - \Phi)$. But it is assumed for simplicity that $\Phi = 0$ because this assumption does not affect the basic discussion of this invention.) Here, $\delta_0$, $\omega$, and t are phase difference amplitude, angular frequency, and time respectively. After passing through the photoelastic modulator 16, the light is incident on the sample 20 at an angle $\Phi$, reflected from sample 20 and travels through analyzer 22. Then, finally, the light is detected by photomultiplier 24.

The dc component of the output of photomultiplier 24 is selectively amplified by the dc amplifier 26 and the resulting amplified output is applied to the sensitivity adjustment circuit 28. The sensitivity adjustment circuit 28 adjusts the sensitivity of the photomultiplier 24 so that the magnitude (voltage) of this dc component is maintained constant.

On the other hand, the ac component of the output of the photomultiplier 24 is applied to the lock-in amplifiers 30 and 32 via capacitor $C_1$. The driving circuit 18 supplies the reference signals $V_r \sin \omega t$ and $V_{2r} \sin 2\omega t$ to the lock-in amplifiers 30 and 32 respectively. The lock-in amplifiers 30 and 32 produce, at the output, voltages $A_1$ and $A_2$ proportional to the amplitudes of the components of angular frequencies $\omega$ and $2\omega$ included in the input signal, respectively. These voltages, $A_1$ and $A_2$, are supplied to the analogue-to-digital converters 34 and 36 to transform them to digital signals. The resulting digital signals are applied to the microcomputer 38.

By setting the phase difference amplitude $\delta_0$ so that the value of the Bessel function of order zero $J_0(\delta_0)$ is zero, that is, by setting $\delta_0 = 2.405$ rad, the microcomputer 38 can determine easily the required values to be measured.

Here, if the wavelength of spectrometer 12 is scanned maintaining the amplitude $V_0$ constant, the phase difference amplitude $\delta_0$ will change. Therefore, while the microcomputer 38 scans the wavelength of spectrometer 12, it adjusts the amplitudes $V_0$ of the output voltage of the driving circuit 18 depending on the wavelength $\lambda$. The relation between $\lambda$ and $V_0$ is beforehand programmed into the microcomputer 38.

Based on $\lambda$, $\delta_0$, $A_1$, and $A_2$, the microcomputer 38, in the known manner, determines the complex index of refraction of the substrate of sample 20 or the thickness and the complex index of refraction of the film formed on the surface of the substrate.

However, when the temperature of the photoelastic modulator 16 itself or the temperature of the atmosphere changes, the phase difference amplitude $\delta_0$ changes. As a consequence, measured results are not accurate. Due to the essentially same reasons, similar problems occur in optical rotatory dispersion meters (ORD), circular dichroism dispersion meters (CD), linear dichroism dispersion meters (LD), linear birefringence dispersion meters (LB), etc.

SUMMARY OF THE INVENTION

In view of these problems, it is an object of the present invention to provide a phase difference controller and a method for controlling the phase difference which can maintain the amplitude of the phase difference produced by a photoelastic modulator constant regardless of the change in the wavelength of light incident into the photoelastic modulator and regardless of the change in the temperature of the photoelastic modulator itself or the atmosphere of if.

Referring to the signs in figures denoting the corresponding constituents of the embodiment, the phase difference controller and the method for controlling the phase difference are described.

The first part of this invention, that is, the phase difference controller, as shown, for example, in FIG. 1, comprises:

- a splitting polarizer 14A, for example birefringence polarizer, which splits the incident light into the main light LM and the reference light LR;
- a photoelastic modulator 16 which the split main and reference light LM and LR pass through and which is forced to vibrate at angular frequency $\omega$;
- an analyzer 42 through which the reference light passes after passing through the photoelastic modulator 16;
- a photo detector 44 which detects the reference light LR traveling from the analyzer 42; and
- photoelastic modulator controller circuits 18A, 46, . . ., 50 which force the photoelastic modulator 16 to vibrate at the angular frequency of $\omega$ so that the ratio of the amplitude of the ac component of the angular frequency of $2\omega$ to the magnitude of dc component included in the output of the photo detector 44 is maintained constant.

In the above constitution, when the reference light LR and the main light LM pass through the photoelastic modulator 16, the photoelastic modulator 16 produces the phase difference $\delta$ between the linearly polarized components whose electric vectors vibrate in the direction perpendicular to each other for both the reference and main light LR and LM. The ratio described above does not depend on either wavelength of the light incident into the photoelastic modulator 16 or temperature of the photoelastic modulator 16 and atmosphere of it, but it only depends on the amplitude $\delta_0$ of the phase difference $\delta$. In other words, if the ratio described above is maintained constant by such a means as the first part of this invention, then the phase difference amplitude $\delta_0$ is also maintained constant.

In a strict sense, there is a slight difference between the phase difference amplitudes $\delta_R$ of the reference light LR and the phase difference amplitude $\delta_M$ ($\delta_0$ described above) of the main light LM, which results from the difference in the position or optical path length in the photoelastic modulator 16 between these two light beams. However, the ratio of these, $\delta_R/\delta_M$, does not depend on any of wavelength of the light, temperature of the photoelastic modulator 16, or temperature of the atmosphere of the photoelastic modulator 16. $\delta_M$ can be maintained constant if $\delta_R$ is maintained constant. Therefore, by controlling the amplitude $\delta_R$ of the phase difference to be constant, the amplitude $\delta_M$ can be controlled accurately to be constant.

Thus, this invention makes a great contribution to improvement in measurement accuracy of ellipsometers, optical rotatory dispersion meters, circular dichroism dispersion meters, linear dichroism dispersion meters, linear birefringence dispersion meters, etc.

In the first manner of the first part of this invention, as shown in FIG. 1, the photo detector is composed of, for example, a photomultiplier 44; and the photoelastic modulator control circuit comprises, for example, a dc amplifier 46 which amplifies a dc component contained in the output from the photo detector 44;

a sensitivity adjustment circuit 48 which adjusts the sensitivity of the photomultiplier so that the dc component described above is maintained constant;

a lock-in amplifier 50 which outputs a signal proportional to the amplitude or the square of the amplitude of the ac component of angular frequency of $2\omega$ contained in the output of the photo detector 44; and a photoelastic modulator driving circuit 18A which forces the elastic modulator 16 to vibrate at angular frequency of $\omega$ so that the output from lock-in amplifier 50 is maintained constant.

The splitting polarizer described above comprises for example, as shown in FIG. 1, a birefringence polarizer 14A which splits the incident light into ordinary light and extraordinary light, either of which acts as reference light and the other of which acts as main light. Or the splitting polarizer comprises, as shown in FIG. 5:

a polarizer 14;

a beam splitter 142 which splits the incident light into transmitted light and reflected light which pass through the polarizer 14; and a reflector 143 which reflects the transmitted light to pass through the polarizer 14.

The former splitting polarizer has the feature that its constitution is simple. The latter one has the feature that it is possible to adjust the angle between the two light rays described above which pass through the polarizer 14.

The method for controlling the phase difference of the present invention is such a method that by using either of the phase difference controllers described above;

the intensities of the ac component of modulation angular frequency of $2\omega$ included in the intensity signal of light which passed through the analyzer 22 arranged on the optical path of the main light are enabled to be identical to each other for both the cases in one of which the transmission axis of the analyzer 22 is oriented at zero degree with respect to the transmission axis of the splitting polarizer 14A and in the other of which the transmission axis of the analyzer 22 is oriented at 90 degrees with respect to the transmission axis of the splitting polarizer 14A; and the ratio of the amplitude of the ac component of angular frequency of $2\omega$ included in the output of the photo detector 44 to the magnitude of the dc component included in the output of the photo detector 44 is maintained constant.

The constitution described here can achieve the condition $J_0(\delta_0)=0$ more accurately compared to the constitution wherein the intensities of the ac component of modulation angular frequency of $2\omega$ included in the intensity signal of light which passed through the analyzer 42 arranged on the optical path of the reference light are enabled to be identical to each other for both the cases in one of which the transmission axis of the analyzer 42 is oriented at zero degree with respect to the transmission axis of the splitting polarizer 14A and in the other of which the transmission axis of the analyzer 42 is oriented at 90 degrees with respect to the transmission axis of the splitting polarizer 14A. Here, $J_0$ is a Bessel function of order zero. By maintaining the ratio described above constant, the corresponding ratio in the main optical path can be maintained constant thus $\delta_0$ is maintained constant with no dependence on the wavelength $\lambda$ of the light incident into the photoelastic modulator 16, the temperature of the photoelastic modulator 16, and the temperature of the atmosphere of it. Because $J_0(\delta_0)=0$, the value of the phase difference amplitude $\delta_0$ can be obtained easily thus the values to be measured can be obtained easily in an ellipsometer and the like to which the phase difference controller is applied.

DESCRIPTION OF THE PREFERRED EMBODIMENTS

Referring to the figures, the preferred embodiments of the present invention are explained in the following description.

1) THE FIRST EMBODIMENT

Figure 1:
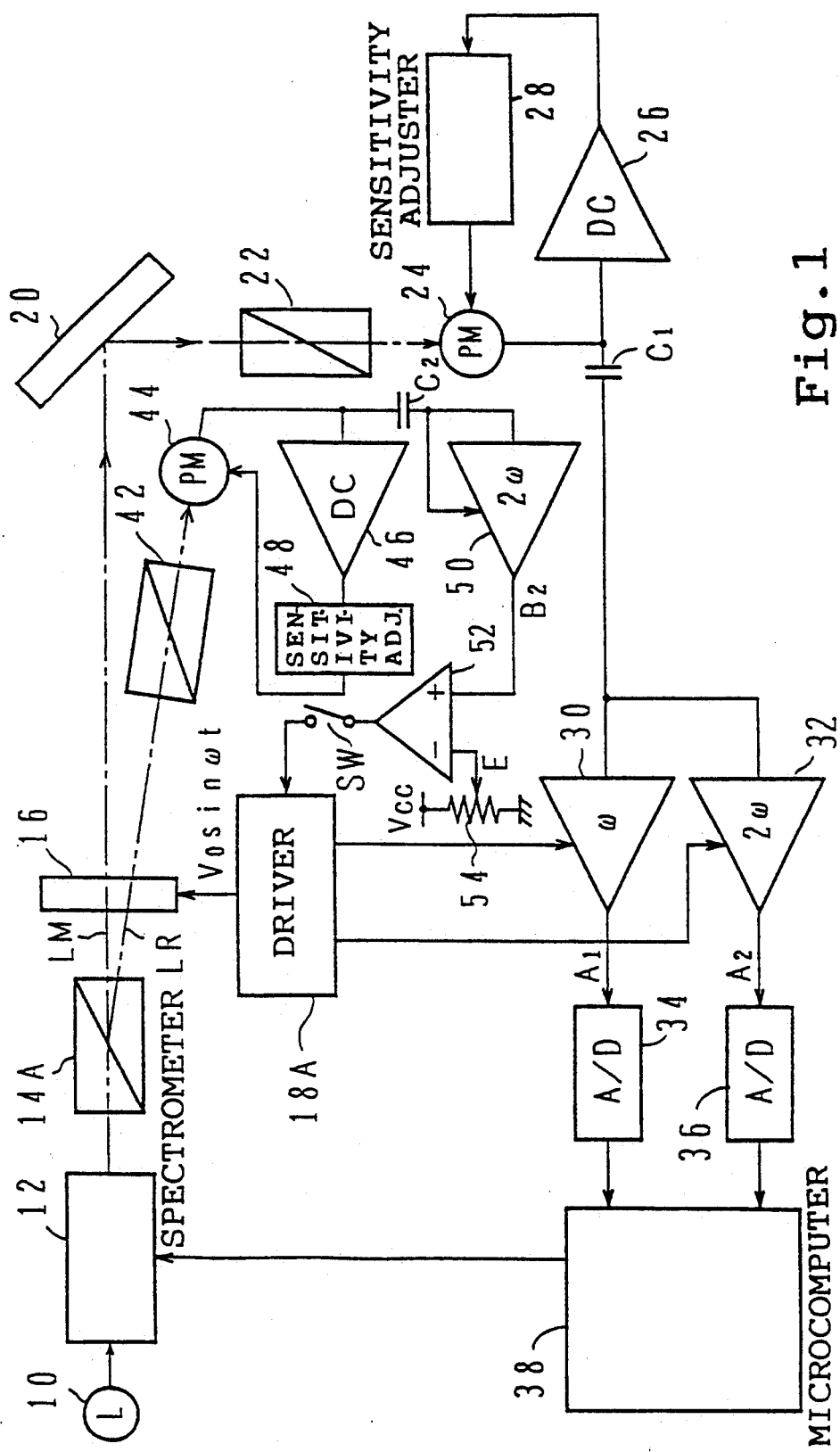
FIG. 1 is a schematic diagram showing the constitution of an ellipsometer employing a phase difference controller of the first embodiment according to the present invention.

FIG. 1 shows an ellipsometer of the first embodiment according to the present invention. The same signs are marked for the same constituents as those in FIG. 6 and the explanation for those are not given here again.

This ellipsometer has a birefringence polarizer 14A, for example a Rochon prism, which acts as a splitting polarizer and is arranged between a spectrometer 12 and an photoelastic modulator 16. After passing through the birefringence polarizer 14A, light is split into the main light LM and the reference light LR. For example, the main light is ordinary light and the reference light is extraordinary light, and the electrical vectors of these light vibrate in the direction perpendicular to each other.

Figure 6:
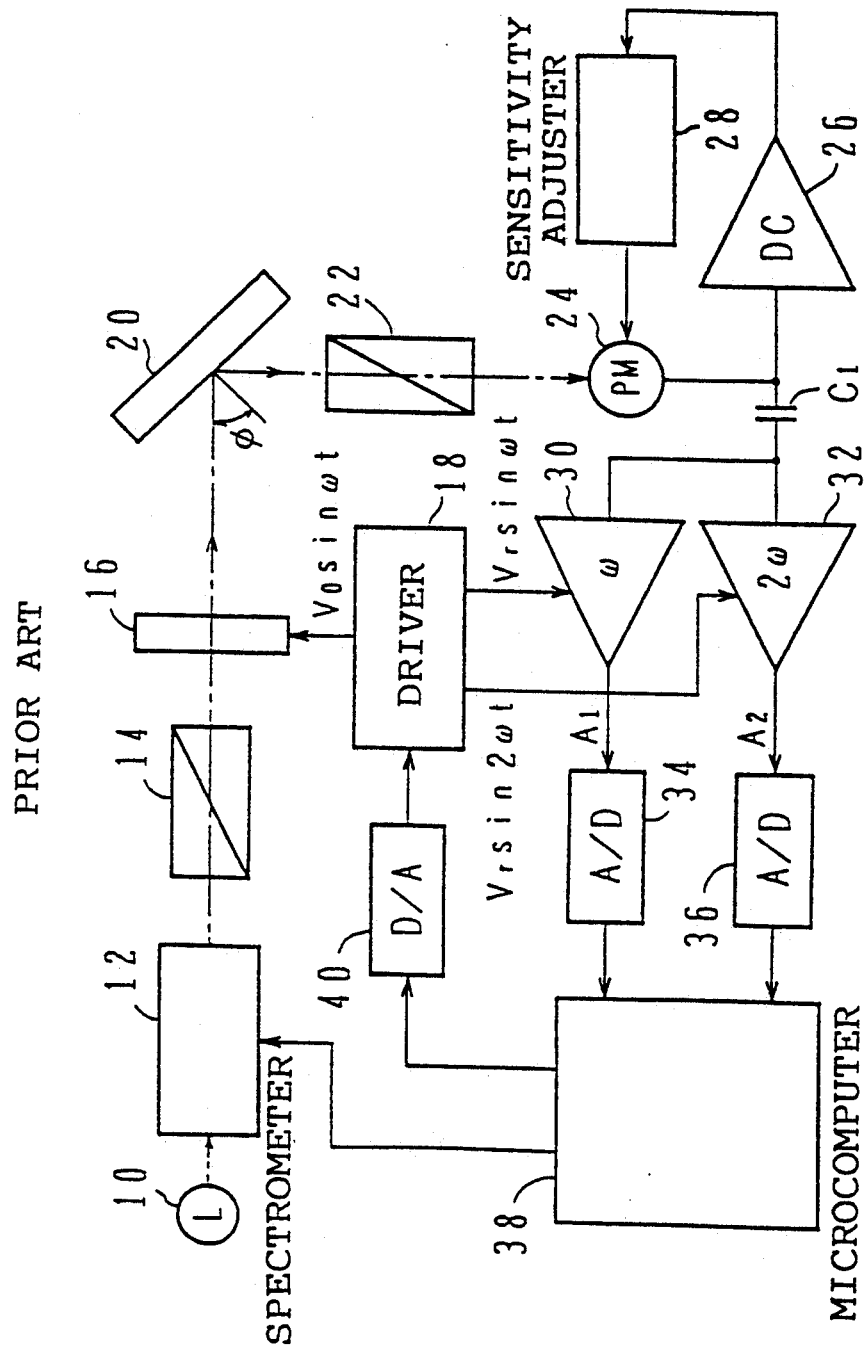
FIG. 6 is a schematic diagram showing the constitution of a conventional ellipsometer.

After the both of the main light LM and reference light LR pass through the photoelastic modulator 16, the main light LM travels on the same optical path as that in FIG. 6.

On the other hand, the reference light LR passes through an analyzer 42 and then it is detected by a photomultiplier 44. The dc component in the output from the photomultiplier 44 is selectively amplified by a dc amplifier 46, and the amplified signal is applied to a sensitivity adjustment circuit 48. The sensitivity adjustment circuit 48 adjusts the sensitivity of the photomultiplier 44 so that the magnitude (voltage) of this dc component is maintained constant.

The ac component in the output from the photomultiplier 44 is applied to a lock-in amplifier 50 via a capacitor $C_2$. This signal is also applied to the lock-in amplifier 50 as a reference signal. The lock-in amplifier 50 produces at the output the amplitude $B_2$ of the ac signal of angular frequency $2\omega$, and this output is applied to the noninverted input terminal of a differential amplifier 52. The voltage E set by a target value setting circuit 54 is applied to the inverted input terminal of the differential amplifier 52. The output of the differential amplifier 52 is applied as an operation signal to a driving circuit 18A via a switch SW. The driving circuit 18A adjusts the amplitude $V_0$ of the output voltage $V_0 \sin \omega t$ so that the operation signal described above becomes zero. Incidentally, when the switch SW is turned off, the driving circuit 18A sets the amplitude $V_0$ of the output voltage $V_0 \sin \omega t$ to be a certain constant value.

In this first embodiment, there is no need for the microcomputer 38 to supply a signal to the driving circuit 18A for changing $V_0$ depending on the wavelength $\lambda$. The other things are same as those in the case shown in FIG. 6.

Figure 2:
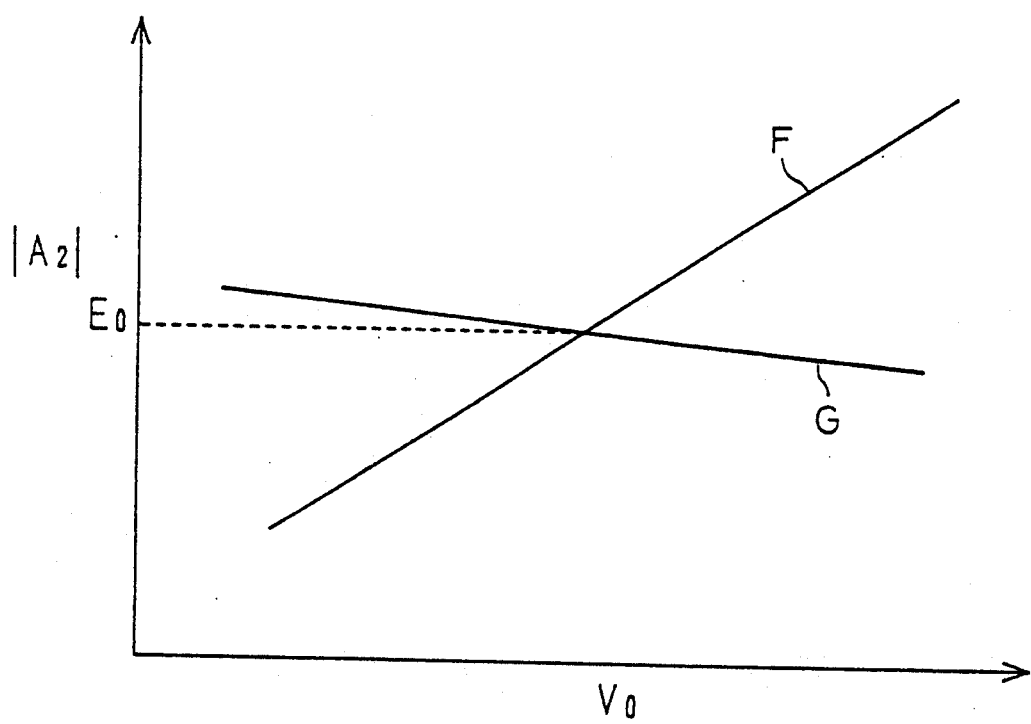
FIG. 2 is a graphical representation of a method for determining the target value which is to be set in a target value setting circuit 52.

Next, the method for setting the target value to the target value setting circuit 54 is explained. Hereafter, the selective wavelength of the spectrometer 12 is fixed.
(A) First, the direction of the transmission axis of the analyzer 42 is adjusted to be oriented parallel to the direction of the transmission axis of the birefringence polarizer 14A. That is, while the switch SW is off, the rotation angle of the analyzer 42 is adjusted in such a way that the signal $B_2$ is maximized, and then it is fixed.
(B) The main light LM is incident into the analyzer 22 straight and directly from the photoelastic modulator 16 without the sample 20. Then, the orientation of the transmission axis of the analyzer 22 is adjusted to be parallel to the orientation of the transmission axis of the birefringence polarizer 14A. That is, the rotation angle of the analyzer 22 is adjusted and then fixed so that the signal $A_2$ is maximized. (C) The switch SW is turned on. Then the output voltage E of the target value setting circuit 54 is varied to measure the relation between the voltage E and the output voltage $A_2$ of the lock-in amplifier 32. As the voltage E changes, the amplitude $V_0$ also changes. The relationship between $V_0$ and $|A_2|$ is, for example, such as shown in FIG. 2. (D) Then, the analyzer 22 is rotated around the optical axis by 90 degrees. After that, the output voltage E of the target value setting circuit 54 is varied again to measure the relation between the voltage E and the output voltage $A_2$ of the lock-in amplifier 32. As the voltage E changes, the amplitude $V_0$ also changes and the relationship between $V_0$ and $|A_2|$ is, for example, like G in FIG. 2. (E) Voltage E is set to be $E_0$ so that $|A_2|$ in the step (C) becomes identical to $|A_2|$ in the step (D) on the condition of the same value E. This implies that the voltage corresponding to the intersection of F and G in FIG. 2 is chosen as the target value $E_0$ for $B_2$, which is applied to the target value setting circuit 54.

After $E_0$ is set according to this procedure, measurements on the sample 20 is carried out in a manner similar to conventional one.

The function and effectiveness of the above setting is explained in the following description.

Let the output light from the spectrometer 12 be described by Stokes vector, I, and let the birefringence polarizer 14A, photoelastic modulator 16 and analyzer 22 be described by Müller matrices $P_{90}$, $M_{45}$ and $A_{90}$ respectively, then the output light from the analyzer 22 can be given by $A_{90}M_{45}P_{90}I$, or more specifically $$\frac{1}{2}\begin{bmatrix} 1 & -1 & 0 & 0 \\ -1 & 1 & 0 & 0 \\ 0 & 0 & 0 & 0 \\ 0 & 0 & 0 & 0 \end{bmatrix} \begin{bmatrix} 1 & 0 & 0 & 0 \\ 0 & \cos\delta & 0 & -\sin\delta \\ 0 & 0 & 1 & 0 \\ 0 & \sin\delta & 0 & \cos\delta \end{bmatrix} \frac{1}{2}\begin{bmatrix} 1 & -1 & 0 & 0 \\ -1 & 1 & 0 & 0 \\ 0 & 0 & 0 & 0 \\ 0 & 0 & 0 & 0 \end{bmatrix} \begin{bmatrix} 1 \\ 0 \\ 0 \\ 0 \end{bmatrix}$$

Performing the above calculation, the intensity of the output light from the analyzer 22, $I_0$, is given by $$I_0 = (1 + \cos\delta)/4 \quad (1)$$

where, as described above, $$\delta = \delta_0 \sin \omega t \quad (2)$$

If a Bessel function of order i is denoted by $J_i$ then the following expansion can be obtained.

$$\cos(\delta_0 \sin \omega t) = J_0(\delta_0) + 2J_2(\delta_0)\cos(2\omega t) + 2J_4(\delta_0)\cos(4\omega t) + \ldots \quad (3)$$

Therefore, denoting the gain of the photomultiplier 24, the gain of the dc amplifier 25 and the gain of the lock-in amplifier 32 by $G_0$, $G_1$ and $G_2$ respectively, the output D of the dc amplifier 26 and the output $A_2$ of the lock-in amplifier 32 are respectively given by the following equations.

$$D = K_1 G_0 G_1 \{1 + J_0(\delta_0)\} \quad (4)$$

$$A_2 = K_2 G_0 G_2 J_2(\delta_0) \quad (5)$$

where $K_1$ and $K_2$ are the constants.

From equations (1) and (2), the following equation is obtained.

$$A_2 = K_2 D G_2 J_2(\delta_0) / [K_1 G_1 \{1 + J_0(\delta_0)\}] \quad (6)$$

In this embodiment, gain $G_1$ of the dc amplifier 26, the output D and gain $G_2$ of the lock-in amplifier 32 are constant. Therefore, $K_2 D G_2 J_2(\delta_0)/K_1 G_1$ in equation (6) is constant.

In a similar way, the output of the lock-in amplifier 32 is given as follows for the case that the analyzer 22 is rotated further by 90 degrees around the optical axis.

$$A_2 = -K_2 D G_2 J_2(\delta_0) / [K_1 G_1 \{1 - J_0(\delta_0)\}] \quad (7)$$

Therefore, from equations (6) and (7), we get $J_0(\delta_0) = 0$ at the intersection of F and G in FIG. 2, that is, $\delta_0 = 2.405$ rad. As can be apparently seen from equations (6) and (7), $A_2$ does not depend on the wavelength $\lambda$ of light incident into the photoelastic modulator 16, temperature of the photoelastic modulator 16 and temperature of the atmosphere of it, but it only depends on the phase difference amplitude $\delta_0$. In other words, if $A_2$ is constant then the phase difference amplitude $\delta_0$ is also constant.

In a strict sense, there is a slight difference between the phase difference amplitudes $\delta_R$ of the reference light LR and the phase difference amplitude $\delta_M$ ($\delta_0$ described above) of the main light LM, which results from the difference in the position or optical path length in the photoelastic modulator 16 between these two light beams. However, the ratio of these, $\delta_R/\delta_M$, does not depend on any of wavelength of light, temperature of the photoelastic modulator 16, and temperature of the atmosphere of the photoelastic modulator 16. Therefore, $\delta_M$ is maintained constant if $\delta_R$ is maintained constant.

As a result, by setting the target value in such a way described above, $\delta_0$ can be maintained constant at 2.405 rad regardless of the change in the wavelength $\lambda$ or the change in temperature. That is, the voltage amplitude $V_0$ changes so that $\delta_0$ is maintained constant at 2.405 rad.

Furthermore, the object of the present invention can be achieved by the following modification. That is, after the step (B) in the above description, the analyzer 22 is rotated by 45 degrees around the optical axis and then fixed. A polarizer for calibration (not represented in figures) is arranged between the photoelastic modulator 16 and the analyzer 22. In the step (C) in the above description, the transmission axis of this polarizer for calibration is oriented parallel to the transmission axis of the birefringence polarizer 14A. In the step (D) in the above description, the transmission axis of this polarizer for calibration is rotated further by 90 degrees around the optical axis.

Furthermore, the amplifier which outputs a voltage signal proportional to the amplitude of the ac component of angular frequency of $2\omega$ is applicable as a lock-in amplifier 50 to achieve the object of the present invention.

2) EXAMPLE OF MEASUREMENT

An example of the measurement is explained in the following description to show the effectiveness of the embodiment.

Figure 3A:
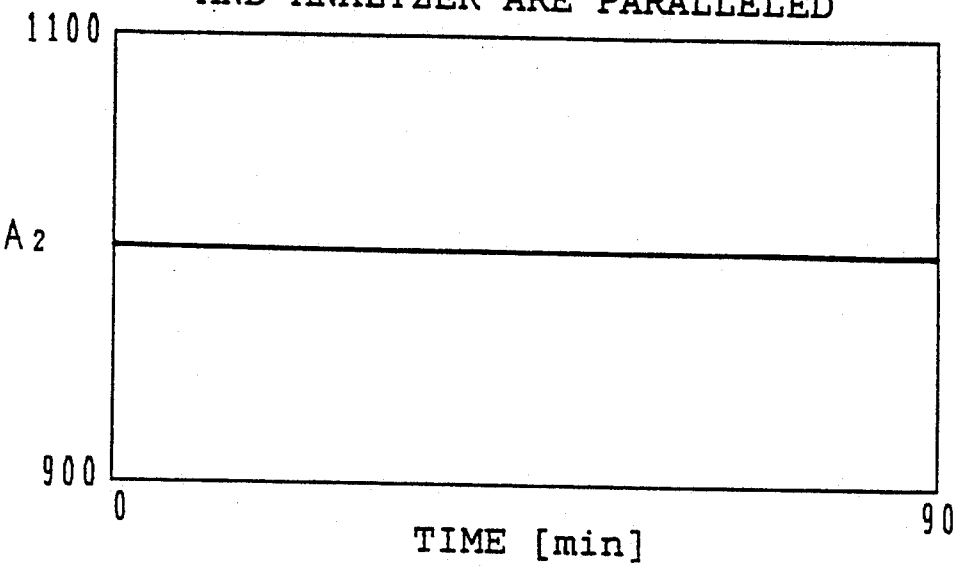
FIGS. 3(A) and 3(B) are graphs showing the output $A_2$ of a lock-in amplifier 32 as a function of time after the equipment is turned on under the condition that a sample 20 is removed from the equipment shown in FIG. 1 and that a birefringence polarizer 14A and analyzer 22 are arranged in such a way that the optical axes of a birefringence polarizer 14A and analyzer 22 are on the same straight line and under the condition that the selection wavelength of a spectrometer 12 is fixed; where graph (A) corresponds to the case that the transmission axis of the birefringence polarizer 14A is parallel to the transmission axis of the analyzer 22 and graph (B) corresponds to the case that after the condition in the graph (A) is achieved the transmission axis of the analyzer 22 is rotated further by 90 degrees with respect to the transmission axis of the birefringence polarizer 14A.
Figure 3B:
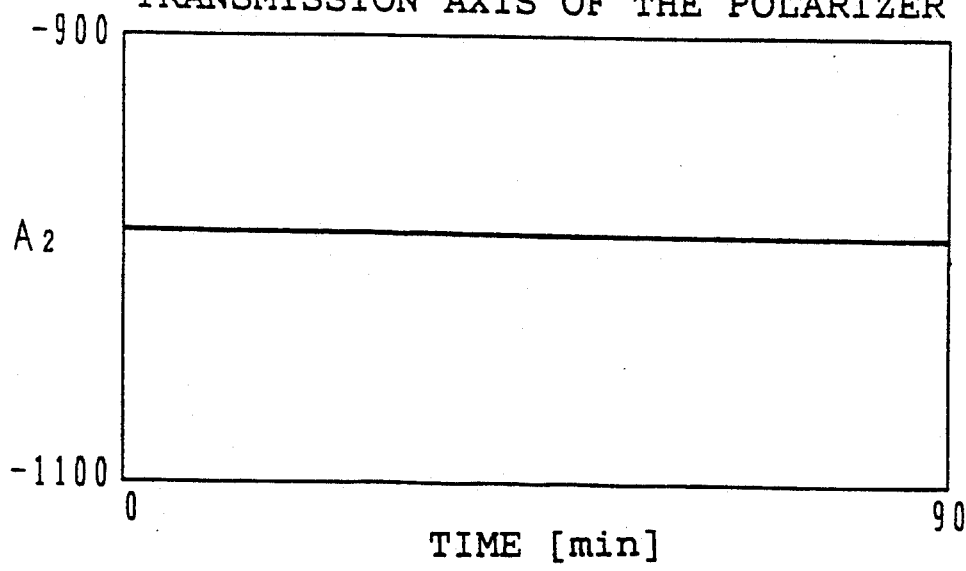

FIGS. 3(A) and 3(B) are graphs showing the output $A_2$ of the lock-in amplifier 32 as a function of time after the ellipsometer shown in FIG. 1 is turned on under the condition that a sample 20 is removed and that the birefringence polarizer 14A and analyzer 22 are arranged in such a way that both the optical axes of a birefringence polarizer 14A and analyzer 22 are on the same straight line and under the condition that the selective wavelength of a spectrometer 12 is fixed. Here graph (A) corresponds to the case that the transmission axis of the birefringence polarizer 14A is parallel to the transmission axis of the analyzer 22 and graph (B) corresponds to the case that the transmission axis of the analyzer 22 is rotated further by 90 degrees with respect to the transmission axis of the birefringence polarizer 14A.

Figure 4A:
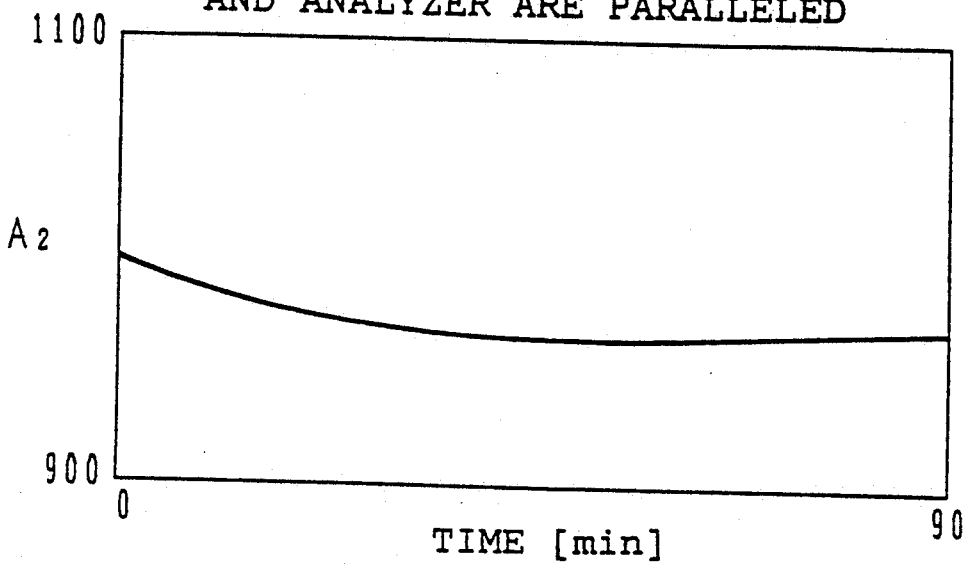
FIGS. 4(A) and 4(B) are the graphs corresponding to FIGS. 3(A) and 3(B) for the case that a conventional ellipsometer shown in FIG. 6 is used.
Figure 4B:
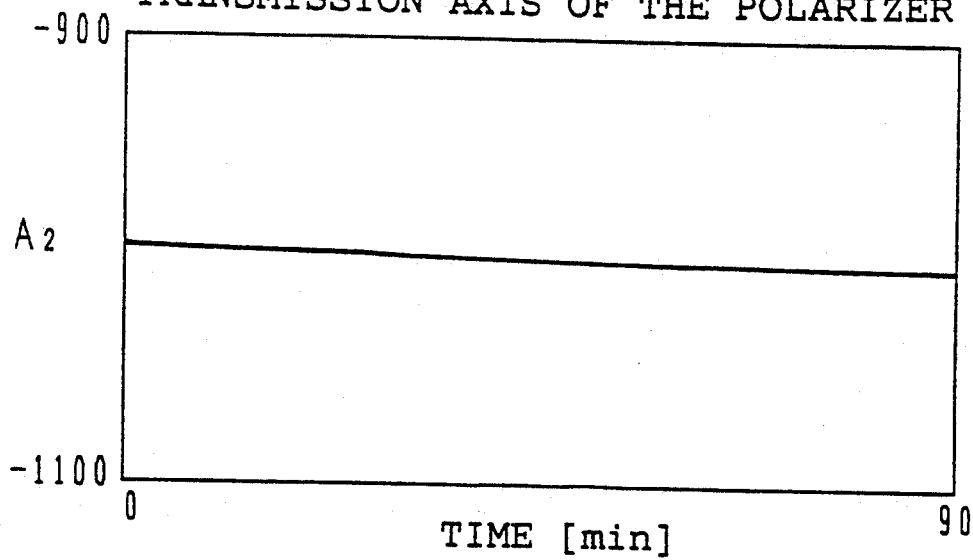

FIG. 4(A) and 4(B) show the change in the output $A_2$ of a conventional ellipsometer under the similar condition. FIGS. 4(A) and 4(B) corresponds to FIGS. 3(A) and 3(B) respectively.

Comparing these graphs, it can be seen that the present invention is apparently effective.

3) THE SECOND EMBODIMENT

Figure 5:
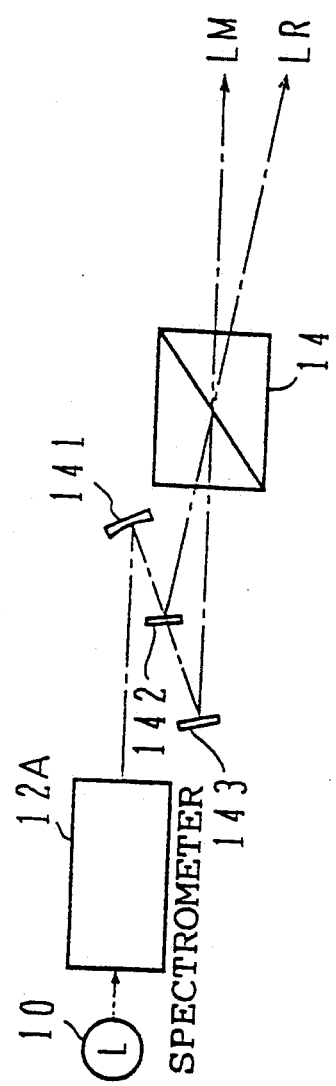
FIG. 5 is a schematic diagram showing the constitution of a splitting polarizer of the second embodiment according to the present invention.

FIG. 5 shows the constitution of a splitting polarizer of the second embodiment according to this invention.

When a Rochon prism is used as a birefringence polarizer 14A in FIG. 1, the angle between the main light LM and the reference light LR is determined by the quality of the material and the form of the Rochon prism. As a result, the wavelengths of light which are transmittable through the birefringence polarizer 14A are limited to a certain range. And the arrangement of the optical systems is also restricted. Because the angle described above is so small such as about 2 degrees, long optical path lengths are required for main light LM and reference light LR and the large dimensions of the optical systems are needed.

When it is required to make easy setting of the angle between the main light LM and the reference light LR at arbitrary degrees in an allowable range, a splitting polarizer having such a constitution, for example, as shown in FIG. 5 is used.

This splitting polarizer comprises a concave mirror 141 which converts the diverging beam of light from the spectrometer 12A into a parallel beam; a beam splitter 142 which splits the parallel beam reflected from the concave mirror 141 into transmitted and reflected beams of light; a plane mirror 143 which reflects this transmitted beam; and a polarizer 14 through which the light beam reflected from the beam splitter 142 and the beam reflected from the plane mirror 143 pass. For example the light reflected from the plane mirror 143 is used as a main light LM and the light reflected from the beam splitter 142 is used as a reference light LR. Both the main and reference light pass through the same point in the polarizer 14 and it is preferable that these two light beam cross there at as small angle as possible. This angle must be smaller than the maximum tolerable angle of field of view to enable its function and, at the same time, the angle must be large enough so that the reference light LR can be incident into the analyzer 42 separated from the main light LM. The preferable angle, for example, is 3 through 20 degrees.

The other things are same as those in the first embodiment described above.

This invention is not limited to those described above, but there are a lot of modifications. For example, from equations (4) and (5) it can be apparently seen that the constitution where the ratio of the output from the lock-in amplifier 50 which outputs the signal proportional to the square of the amplitude of the ac component of angular frequency $2\omega$ to the square of the output from the dc amplifier 46 or the ratio of the output from the lock-in amplifier 50 which outputs the signal proportional to the amplitude of the ac component of angular frequency $2\omega$ to the output from the dc amplifier 46 is applied to the driving circuit 18A can be used instead of the sensitivity adjustment circuit 48. Furthermore, the phase difference amplitude $\delta_0$ is not limited to 2.405 rad but it is only necessary that $\delta_0$ is maintained constant at a certain value. For example, 1.840 is preferable as a phase difference amplitude $\delta_0$ for circular dichroism dispersion meters (CD) or linear birefringence dispersion meters (LB) and 3.05 rad is preferable for optical rotatory dispersion meters (ORD) or linear dichroism dispersion meters (LD). Furthermore, in the above explanations of the embodiments, the phase difference controller and the method for controlling the phase difference according to the present invention are applied to an ellipsometer, but this invention is apparently applicable to other equipments, for example, optical rotatory dispersion meters (ORD), circular dichroism dispersion meters (CD), linear dichroism dispersion meters (LD), and linear birefringence dispersion meters (LB), and others.

What is claimed is:

1. A phase difference controller for controlling a phase difference $\delta_0 \sin(\omega t - \Phi)$ between two linearly polarized components, which electrical vectors vibrate in direction perpendicular to each other, of light out of a photoelastic modulator which is forced to vibrate at angular frequency $\omega$ by an input voltage $V_0 \sin \omega t$, where $\delta_0$ is amplitude of the phase difference, t is time, $\Phi$ is phase and $V_0$ is amplitude of the input voltage, comprising:

a splitting polarizer (14A) for splitting incident linearly polarized monochromatic-light into main light (LM) and reference light (LR), said split main light and reference light passing through the photoelastic modulator, said main light being used as the phase-difference controlled light, said reference light being used for controlling the phase difference;

an analyzer (42) for passing through said reference light from said photoelastic modulator;

a photodetector (44) for detecting said reference light from said analyzer; and a photoelastic modulator control circuit (18A, 46–50) for outputting the voltage $V_0 \sin(\omega t)$ to the photoelastic modulator and adjusting the amplitude $V_0$ so that a ratio of amplitude of ac component of angular frequency of $2\omega$ to magnitude of dc component included in an output of said photodetector is maintained constant in order to make the amplitude $\delta_0$ constant.

2. A phase difference controller as defined in claim 1, wherein:

said photodetector (44) is a photomultiplier (44);

said photoelastic modulator control circuit comprises a dc amplifier (46) for ampligying said dc component included in said output of said photodetector;

a sensitivity adjustment circuit (48) for adjusting sensitivity of said photomultiplier so that said magnitude of said dc component is maintained constant;

a lock-in amplifier (5) which produces a signal proportional to said amplitude or square of said amplitude of said ac component of angular frequency of $2\omega$ included in said output of said photodetector; and a photoelastic modulator driving circuit (18A) for outputting said voltage $V \sin(\omega)$ to said photoelastic modulator and adjusting said amplitude $V$ so that said signal produced by said lock-in amplifier is maintained constant.

3. A phase difference controller as defined in claim 2 wherein said splitting polarizer (14A) is a birefringence polarizer for splitting said incident light into ordinary light and extraordinary light one of which acts as said reference light and the other of which acts as said main light.

4. A phase difference controller as defined in claim 2 wherein said splitting polarizer comprises;

a polarizer (14);

a beam splitter (142) for splitting said incident light into transmitted light and reflected light which pass through said polarizer (14); and a reflector (143) for reflecting said transmitted light to pass through said polarizer.

5. A method for adjusting phase difference of an apparatus including; a phase difference controller for controlling a phase difference $\delta_0 \sin(\omega t - \Phi)$ between two linearly polarized components, which electrical vectors vibrate in directions perpendicular to each other, of light out of a photoelastic modulator which is forced to vibrate at angular frequency $\omega$ by an input voltage $V_0 \sin \omega t$, where $\delta_0$ is amplitude of the phase difference, t is time, $\Phi$ is phase and $V_0$ is amplitude of the input voltage; a first analyzer (22) for passing through the phase-difference-controlled light from the photoelastic modulator; and a first photodetector (24) for detecting the phase-difference-controlled light from the first analyzer;

wherein the phase difference controller including: a splitting polarizer (14A) for splitting incident linearly polarized monochromatic-light into main light (LM) and reference light (LR), the split main light and reference light passing through the photoelastic modulator, the main light being used as the phase-difference-controlled light, the reference light being used for controlling the phase difference; a second analyzer (42) for passing through the reference light from the photoelastic modulator; a second photodetector (44) for detecting the reference light from the second analyzer; and a photoelastic modulator control circuit (18A, 46–50) for outputting the voltage $V_0 \sin(\omega t)$ to the photoelastic modulator and adjusting the amplitude $V_0$ so that a ratio of amplitude of ac component of angular frequency of $2\omega$ to magnitude of dc component included in an output of the second photodetector is maintained constant in order to make the amplitude $\delta_0$ constant;

wherein the method comprising steps of;

adjusting a direction of a transmission axis of the second analyzer (42) parallel to a direction of a transmission axis of the splitting polarizer (14A);

adjusting a direction of a transmission axis of the first analyzer (22) parallel to a direction of the transmission axis of the splitting polarizer (14A);

finding a first relation between the amplitude $V_0$ and an amplitude of ac component of angular frequency of $2\omega$ included in an output of the first photodetector by varying the amplitude $V_0$;

rotating the first analyzer around its optical axis by 90 degrees;

finding a second relation between the amplitude $V_0$ and an amplitude of ac component of angular frequency of $2\omega$ included in an output of the first photodetector by varying the amplitude $V_0$;

setting the amplitude $V_0$ at a value such that the first relation is identical to the second relation so as to equal the Bessel function $J_0(\delta_0)$ of the 0th order to 0; and starting the phase difference control by the phase difference controller after the setting.

6. A method as defined in claim 5, wherein said photodetector (44) is a photomultiplier (44);

said photoelastic modulator control circuit comprises a dc amplifier (46) for amplifying said dc component included in said output of said photodetector;

a sensitivity adjustment circuit (48) for adjusting sensitivity of said photomultiplier so that said magnitude of said dc component is maintained constant;

a lock-in amplifier (5) which produces a signal proportional to said amplitude or square of said amplitude of said ac component of angular frequency of $2\omega$ included in said output of said photodetector; and a photoelastic modulator driving circuit (18A) for outputting said voltage $V_0 \sin(\omega)$ to said photoelastic modulator and adjusting said amplitude $V_0$ so that said signal produced by said lock-in amplifier is maintained constant.

7. A method as defined in claim 5, wherein said splitting polarizer (14A) is a birefringence polarizer for splitting said incident light into ordinary light and extraordinary light one of which acts as said reference light and the other of which acts as said main light.

8. A method as defined in claim 5, wherein said splitting polarizer comprises;

a polarizer (14);

a beam splitter (142) for splitting said incident light into transmitted light and reflected light which pass through said polarizer (14); and a reflector (143) for reflecting said transmitted light to pass through said polarizer.

* * * * *